(12) United States Patent
Chang et al.

(10) Patent No.: US 11,927,512 B2
(45) Date of Patent: Mar. 12, 2024

(54) METHOD FOR DETERMINING COATING THICKNESS ON COATED CONTACT LENSES

(71) Applicant: Alcon Inc., Fribourg (CH)

(72) Inventors: Yuan Chang, Atlanta, GA (US); Ying Zheng, Suwanee, GA (US); Junhao Ge, Johns Creek, GA (US); Steve Yun Zhang, Sugar Hill, GA (US); Karen Belinda Sentell, Alpharetta, GA (US); Jinbo Dou, Johns Creek, GA (US)

(73) Assignee: Alcon Inc., Fribourg (CH)

( * ) Notice: Subject to any disclaimer, the term of this patent is extended or adjusted under 35 U.S.C. 154(b) by 726 days.

(21) Appl. No.: 17/087,983

(22) Filed: Nov. 3, 2020

(65) Prior Publication Data

US 2021/0131923 A1 May 6, 2021

Related U.S. Application Data

(60) Provisional application No. 62/930,936, filed on Nov. 5, 2019.

(51) Int. Cl.
*G01N 1/30* (2006.01)
*G01N 1/04* (2006.01)
*G01N 21/77* (2006.01)
*G02B 1/04* (2006.01)

(52) U.S. Cl.
CPC ............ *G01N 1/30* (2013.01); *G01N 1/04* (2013.01); *G01N 21/77* (2013.01); *G02B 1/043* (2013.01); *G01N 2001/302* (2013.01); *G01N 2021/7786* (2013.01)

(58) Field of Classification Search
CPC ............ G01N 1/30; G01N 1/04; G01N 21/77; G01N 2001/302; G01N 2021/7786; G02B 1/043
USPC ..................................................... 351/159.02
See application file for complete search history.

(56) References Cited

U.S. PATENT DOCUMENTS

| 3,408,429 A | 10/1968 | Wichterle |
| 4,347,198 A | 8/1982 | Ohkada |
| 4,444,711 A | 4/1984 | Schad |
| 4,460,534 A | 7/1984 | Boehm et al. |
| 5,508,317 A | 4/1996 | Müller |

(Continued)

FOREIGN PATENT DOCUMENTS

EP 1465931 B1 8/2007

*Primary Examiner* — James R Greece
(74) *Attorney, Agent, or Firm* — Jian Zhou

(57) ABSTRACT

The invention provides a method for imaging and thickness determination of coatings on coated contact lenses. The method comprises selectively staining a negatively-charged-groups-containing coating over the lens body of a coated contact lens by immersing the coated contact lens in an aqueous solution comprising a fluorescently-labeled polycationic polymer and having a pH of from about 6.5 to 8.0; orthogonally cutting the selectively-stained coated contact lens; and determining the thickness of the coating on the coated contact lens. In addition, the invention provides a method for selecting a candidate coating material comprising negatively charged groups for applying a coating with a desired thickness onto silicone hydrogel contact lenses and for optimizing a coating process for producing coated silicone hydrogel contact lenses with a desired thickness coating thereon.

6 Claims, 2 Drawing Sheets

(56) References Cited

U.S. PATENT DOCUMENTS

| | | |
|---|---|---|
| 5,583,163 A | 12/1996 | Müller |
| 5,583,463 A | 12/1996 | Merritt |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger et al. |
| 6,303,687 B1 | 10/2001 | Mueller |
| 6,627,124 B1 | 9/2003 | Herbrechtsmeier et al. |
| 6,800,225 B1 | 10/2004 | Hagmann et al. |
| 7,384,590 B2 | 6/2008 | Kelly et al. |
| 7,387,759 B2 | 6/2008 | Kelly et al. |
| 8,480,227 B2 | 7/2013 | Qiu |
| 9,950,483 B2 * | 4/2018 | Qian ................ B29D 11/00865 |
| 10,449,740 B2 | 10/2019 | Qian et al. |
| 2003/0065051 A1 | 4/2003 | Winterton |
| 2014/0356965 A1 * | 12/2014 | Qian ................ B29D 11/00951 |
| | | 436/72 |
| 2019/0179055 A1 | 6/2019 | Qiu et al. |

* cited by examiner

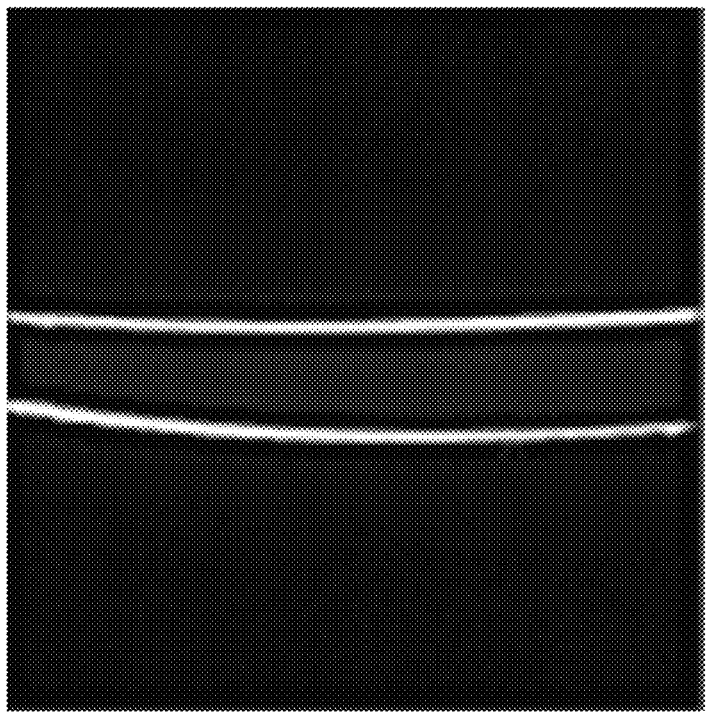
Figure 1
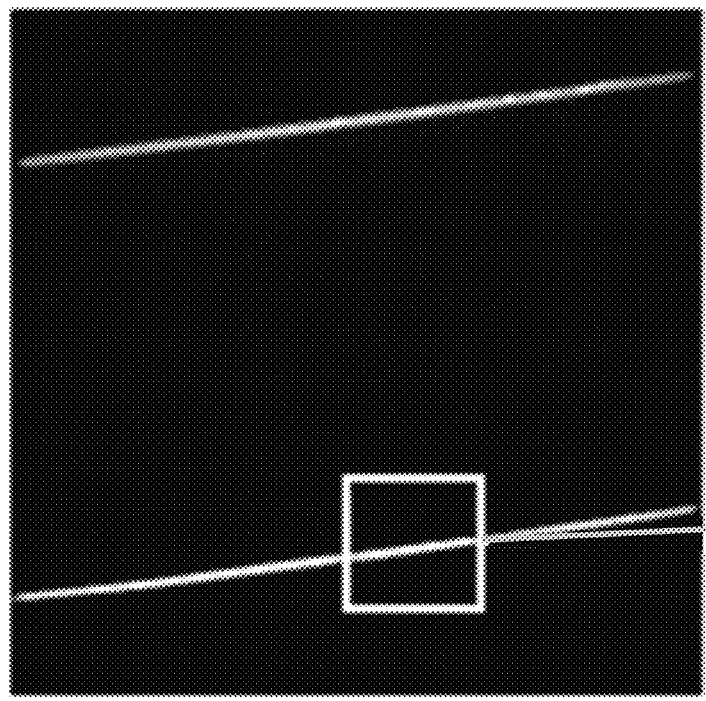
Figure 2
Figure 3

METHOD FOR DETERMINING COATING THICKNESS ON COATED CONTACT LENSES

This application claims the benefit under 35 USC § 119 (e) of U.S. provisional application No. 62/930,936 filed 5 Nov. 2019, herein incorporated by reference in its entirety.

The present invention generally relates to a method for the imaging and thickness determination of a coating on a contact lens. In addition, the present invention provides a method for selecting a candidate coating material comprising negatively charged groups for applying a coating with a desired thickness onto silicone hydrogel contact lenses and for optimizing a coating process for producing coated silicone hydrogel contact lenses with a desired thickness coating thereon.

BACKGROUND

In recent years, a great number of efforts have been made to develop contact lenses with improved wearing comfort. A new class of soft contact lenses, water gradient contact lenses, have been developed in this endeavor. This new class of soft contact lenses have been first developed and successfully introduced as daily-disposable contact lenses, DAILIES® TOTAL1® (Alcon), in the market. Weekly- or monthly-disposable water gradient soft contact lenses have also be developed (see, U.S. Pat. Appl. Pub. No. 2019-0179055 A1). This new class of soft contact lenses is characterized by having a water-gradient layered structural configuration, an increase in water content observed in passing from the core (i.e., the lens bulk material) through one or more hydrogel layers (or coatings) to the surface of the contact lens, reaching the highest water content in the region near and including the surface of the contact lens (see, U.S. Pat. No. 8,480,227). This unique design can deliver a highly-lubricious and extremely-soft, water-rich lens surface that in turn provide superior wearing comfort to patients.

In order to facilitate the development and production of such water gradient contact lenses, it would be desirable to image the coatings on the contact lens and to determine the thickness of the coatings on the contact lens. U.S. Pat. No. 8,480,227 discloses a method for imaging and coating thickness determination by producing a water gradient contact lens with a top layer of a fluorescent hydrogel which is formed directly from a fluorescently-labeled coating material. Such a method cannot be used to image the coating or determine the coating thickness of a contact lens product, because the contact lens product is free of any fluorescent top hydrogel layer. This patent also discloses that the Atomic Force Microscopy (AFM) can be used in determining the coating thickness. But, AFM may not be suitable for imaging the coating from lens edge to lens edge and the thickness determination of any coating on any water gradient contact lenses.

U.S. Pat. No. 9,950,483 discloses how to selectively stain the coatings of dried water gradient contact lenses over the lens bodies with use of a positively-charged dye having acetate as its counter anion) (e.g., thionin acetate) and then to determine the thickness of the coating. However, because the positively charged dye is a small molecule, it can penetrate into the lens body. In order to avoid staining the lens body, the water gradient contact lens needs to be dried and then subjected to a complicated selective staining procedures.

Therefore, there is still a need for a method for imaging and thickness determination of coatings on water gradient contact lenses and for optimizing a coating process for producing water gradient contact lenses.

SUMMARY OF THE INVENTION

The invention, in one aspect, provides a method for determining the thickness of coatings on the surfaces of contact lenses, comprising the steps of: (a) obtaining a coated contact lens in fully hydrated state, wherein the coated contact lens comprises a lens body (i.e., bulk material) and a coating thereon, wherein the lens body comprises a non-silicone hydrogel material or a silicone hydrogel material, wherein the coating comprises a coating material having negatively-charged groups; (b) selectively staining the coating over the lens body of the coated contact lens by immersing the coated contact lens in an aqueous solution of a fluorescently-labeled polycationic polymer for a time period of about 12 hours or less, wherein the aqueous solution comprises buffering agents in an amount for having a pH of from about 6.5 to about 8.0; (c) orthogonally cutting the selectively-stained coated contact lens; and (d) determining the thickness of the coating on the coated contact lens.

In another aspect, the invention provides a method for selecting a candidate coating material comprising negatively-charged groups for applying a coating onto contact lenses, comprising the steps of: (a) obtaining uncoated contact lenses each of which comprises a lens body (i.e., bulk material) which comprises a non-silicone hydrogel material or a silicone hydrogel material; (b) obtaining candidate coating materials each having negatively-charged groups; (c) applying a coating of each candidate coating material onto each uncoated contact lenses to obtain coated contact lenses under identical coating conditions; (d) selectively staining the coatings over the lens bodies of the coated contact lenses in fully hydrated state by immersing the coated contact lenses in an aqueous solution of a fluorescently-labeled polycationic polymer for a time period of about 12 hours or less, wherein the aqueous solution comprises buffering agents in an amount for having a pH of from about 6.5 to about 8.0; (e) orthogonally cutting the selectively stained coated contact lenses; (f) determining the thickness of the coating on each coated contact lens for each candidate coating materials; (g) selecting one candidate coating material that provides coated contact lenses having a desired coating thickness.

In a further aspect, the invention provides a method for optimizing a coating process for producing coated contact lenses, comprising the steps of: (a) obtaining uncoated contact lenses each of which comprises a lens body (i.e., bulk material) which comprises a non-silicone hydrogel material or a silicone hydrogel material; (b) obtaining a coating material having negatively charged groups; (c) applying a coating of the coating material onto each contact lenses to obtain coated contact lenses under first coating conditions; (d) selectively staining the coatings over the lens bodies of the coated contact lenses in fully hydrated state by immersing the coated contact lenses in an aqueous solution of a fluorescently-labeled polycationic polymer for a time period of about 12 hours or less, wherein the aqueous solution comprises buffering agents in an amount for having a pH of from about 6.5 to about 8.0; (e) orthogonally cutting the selectively stained coated contact lenses; (f) determining the thickness of the coating on each coated contact lens; (g) if the thickness determined in step (f) of the coating on each coated contact lenses is thinner than a predetermined thickness criteria, repeating optimization cycles each consisting of steps (b) to (f) until the thickness of the coating on each coated contact lenses meet the criteria, provided that coating conditions in step (b) is changed in each optimization repeating cycle.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

BRIEF DESCRIPTION OF THE DRAWING

FIG. 1 is an image of a cross section of a coated silicone hydrogel contact lens which is stained with an aqueous solution of a fluorescently-labeled polycationic polymer according to a preferred embodiment of the invention.

FIG. 2 is an image of a cross section of a coated silicone hydrogel contact lens which is stained with an aqueous solution of a fluorescently-labeled polycationic polymer according to a preferred embodiment of the invention.

DETAILED DESCRIPTION OF EMBODIMENTS OF THE INVENTION

Figure 3:
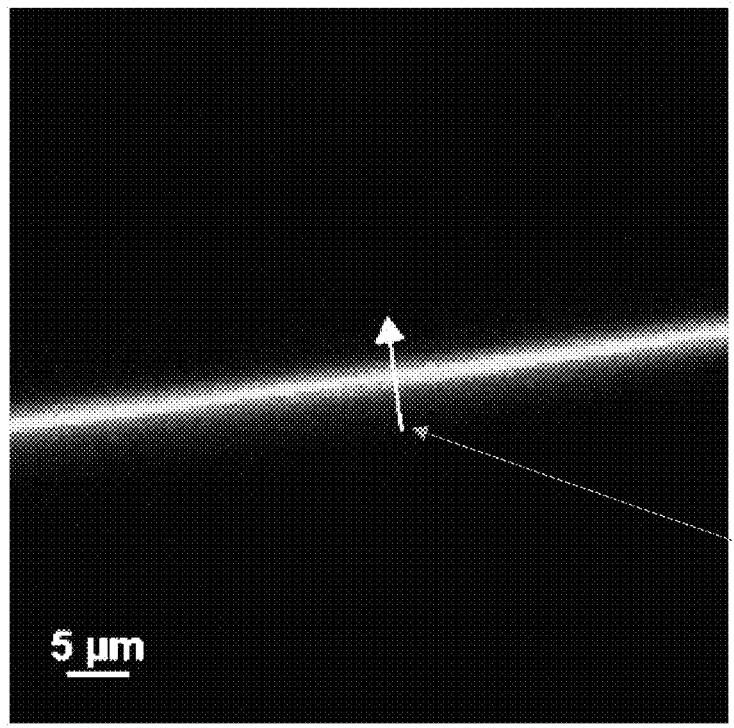
FIG. 3 shows the enlarged image of the area indicated in FIG. 2.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

A "hard contact lens" refers a contact lens comprising a lens body (i.e., lens bulk material) composed of a hard plastics (e.g., polymethylmethacrylate).

A "rigid gas permeable contact lens" refers to a contact lens comprising lens body (i.e., lens bulk material) composed of a gas permeable material (e.g., a material made from fluorosilicone acrylates).

A soft contact lens can be a non-silicone hydrogel contact lens or a silicone hydrogel contact lens. A "non-silicone hydrogel contact lens" refers to a contact lens comprising a lens body (i.e., lens bulk material) composed of a non-silicone hydrogel material. A "silicone hydrogel contact lens" refers to a contact lens comprising a lens body (i.e., lens bulk material) composed of a silicone hydrogel material.

A hybrid contact lens has a central optical zone that is made of a gas permeable lens material, surrounded by a peripheral zone made of silicone hydrogel or regular hydrogel lens material.

An imbedded contact lens comprises a lens body (i.e., lens bulk material) consisting essentially of a 3-dimensional article and a non-silicone hydrogel material or a silicone hydrogel material, wherein the 3-dimensional article is made of a non-hydrogel material and has a 3-dimensional size smaller than that of the contact lens so that it is completely imbedded within a non-silicone hydrogel material or a silicone hydrogel material. A non-hydrogel material can be any material which absorbs less than 10% (preferably about 7.5% or less, more preferably about 5.0% or less, even more preferably about 2.5% or less) by weight of water when being fully hydrated.

A "hydrogel" or "hydrogel material" interchangeably refers to a crosslinked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

As used in this application, the term "silicone hydrogel" or "SiHy" interchangeably refers to a hydrogel containing silicone. A silicone hydrogel (SiHy) typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C<group. Exemplary ethylenically unsaturated groups include without limitation (meth)acryloyl methacryloyl

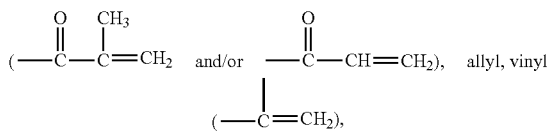

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "macromer" or "prepolymer" refers to a compound or polymer comprising ethylenically unsaturated groups and having a number average molecular weight of greater than 700 Daltons.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

As used in this application, the term "polymer" means a material formed by polymerizing or crosslinking one or more monomers, macromers, prepolymers and/or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one

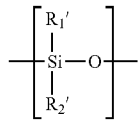

another having a formula of in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{y1}$—$OR^o$ (in which alk is $C_1$-$C_6$ alkyl diradical, $R^o$ is H or $C_1$-$C_4$ alkyl and y1 is an integer from 1 to 10), a $C_2$—$O_{40}$ organic radical having at least one functional group selected from the group consisting of hydroxyl group (—OH), carboxyl group (—COOH), —$NR_3'R_4'$, amino linkages of —$NR_3'$—, amide linkages of —$CONR_3'$—, amide of —$CONR_3'R_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

The term "carboxyl" refers to the carboxyl group (—COOH).

In this application the term "azetidinium" or "3-hydroxyazetidinium" refers to a positively-charged (i.e., cationic), divalent radical (or group or moiety) of

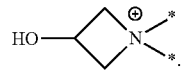

As used in this application, the term "phosphorylcholine" refers to a zwitterionic group of

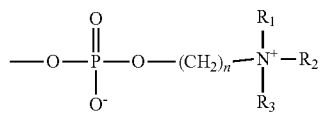

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "carboxyl-containing vinylic monomer" refers to any vinylic monomer having a carboxyl group (—COOH); the term "amino-containing vinylic monomer" refers to any vinylic monomer having an amino group (—NHR').

As used in this application, the term "non-reactive vinylic monomer" refers to any vinylic monomer free of carboxyl group, primary amino group, secondary amino group, epoxide group, isocyanate group, azlactone group

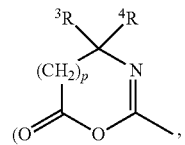

or aziridine group

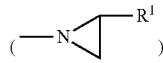

(in which p is 0 or 1; $^3R$ and $^4R$ independently of each other is $C_1$-$C_8$ alkyl; $R^1$ is hydrogen, methyl or ethyl).

The term "reactive vinylic monomer" refers to a vinylic monomer having a reactive functional group selected from the group consisting of carboxyl groups (—COOH), azetidinium group, amino groups (i.e., primary and/or secondary amino groups), azlactone groups, isocyanate groups, epoxy groups, aziridine groups, or combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The term "water-soluble" in reference to a polymer or polymeric material means that the polymer or polymeric material can be dissolved in water to an extent sufficient to form an aqueous solution having a concentration of at least about 0.2% by weight at room temperature (i.e., from about 22° C. to about 28° C., preferably from about 24° C. to about 26° C., in particular at about 25° C.).

A "polycationic polymer" refers to a polymer having at least 10% by mole of monomeric units each having a positively charged groups.

A "fluorescently-labeled polycationic polymer" refers to a polymer which has been chemically modified to have a covalently attached moiety which is capable of emitting fluorescence upon being irradiated with a light.

An "aqueous solution" refers to a solution in which the solvent is water.

As used in this application, the term "lens body" or "lens bulk material" in reference to a contact lens interchangeably means a layer that has a 3-dimensional shape of a contact lens and includes a central curved plane (which divides the contact lens into two parts, one containing the anterior surface and the other containing the posterior surface) and has a variable thickness.

As used in this application, the term "water gradient" in reference to a contact lens means that there is an increase in water content observed in passing from the core to the surface of the contact lens, reaching the highest water content in the region near and including the surface of the contact lens. It is understood that the increase in water content from the core to the surface of the contact lens can be continuous and/or step-wise, so long as the water content is highest in the region near and including the surface of the contact lens.

As used in this application, the term "cross section" of a contact lens refers to a lens section obtained by cutting through the lens with a knife or cutting tool at an angle substantially normal to either of the anterior and posterior surfaces of the lens (i.e., by orthogonally cutting the lens). A person skilled in the art knows well to cut manually (i.e., hand), or with Cryosta Microtome or with a lath, a contact lens to obtain a cross section of the contact lens. A resultant cross section of a contact lens can be polished by using ion etching or similar techniques.

The invention is generally directed to a method for imaging and thickness determination of coatings on coated contact lenses. The invention is partly based on the discoveries that a fluorescently-labeled polycationic polymer can be used to selectively stain a coating comprising negatively-charged groups over the lens body of a coated contact lens according to a simple procedure, i.e., merely by immersing the coated contact lens in an aqueous solution comprising a fluorescently-labeled polycationic polymer and having a pH of from about 6.5 to 8.0. It was found that an aqueous solution (in water) of a fluorescently-labeled polycationic polymer can stains the coating layer containing negatively-charged groups (e.g., carboxyl groups, sulfate groups, phosphorate groups, etc.) without staining the bulk material (lens body) of the coated contact lens. It is believed that when a fluorescently-labeled polycationic polymer has a moderate or high molecular weight (i.e., greater than 1500 Daltons) and a relatively high mole percentage (i.e., at least 50% by mole, preferably at least 60% by mole, more preferably at least 70% by mole, even more preferably 80% by mole, most preferably at least 90% by mole) of monomeric units each having a positively charged group, it can have strong binding with the negatively-charged groups of the coating material in the coating on a coated contact lens through strong electrostatic interactions so as not to penetrate into the lens body.

This selectively staining of the coating over the lens body allows for (1) quickly checking if a coating layer is formed by imaging the coating layer; (2) determining the thickness of the coating layer; (3) establishing model to study surface wettability/lubricity vs. coating materials; and (4) providing feedback information for coating material design and synthesis.

The invention, in one aspect, provides a method for determining the thickness of coatings on the surfaces of contact lenses, comprising the steps of: (a) obtaining a coated contact lens in fully hydrated state, wherein the coated contact lens comprises a lens body (i.e., bulk material) and a coating thereon, wherein the lens body comprises a non-silicone hydrogel material or a silicone hydrogel material, wherein the coating comprises a coating material having negatively-charged groups; (b) selectively staining the coating over the lens body of the coated contact lens by immersing the coated contact lens in an aqueous solution of a fluorescently-labeled polycationic polymer for a time period of about 12 hours or less, wherein the aqueous solution comprises buffering agents in an amount for having a pH of from about 6.5 to about 8.0; (c) orthogonally cutting the selectively-stained coated contact lens; and (d) determining the thickness of the coating on the coated contact lens.

In accordance with all the various aspects of the invention, the lens body of a contact lens of the invention can be derived directly from a preformed contact lens. A preformed contact lens can be any contact lens which has not been subjected to any surface treatment after being produced according to any lens manufacturing processes. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., a lens formulation) typically is dispensed into molds and cured (i.e., polymerized and/or crosslinked) in molds for making contact lenses. The cast-molding is the most popular manufacturing method for producing contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically, preferably by exposing the polymerizable composition in the mold to a spatial limitation of actinic radiation to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

In a preferred embodiment, a preformed contact lens is a hybrid contact lens having a central optical zone made of a rigid gas permeable lens material and surrounded by a peripheral zone made of a hydrogel material.

In another preferred embodiment, a preformed contact lens is a non-silicone hydrogel contact lens (or so-called a conventional hydrogel contact lens).

In another preferred embodiment, a preformed contact lens is a silicone hydrogel contact lens.

Preformed non-silicone hydrogel contact lenses can be any commercially-available non-silicone hydrogel contact lenses or can be produced according to any known methods. For example, for production of preformed non-silicone hydrogel contact lenses, a non-silicone hydrogel lens formulation for cast-molding or spin-cast molding or for making rods used in lathe-cutting of contact lenses typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Preferred examples of water-soluble prepolymers include without limitation: a water-soluble crosslinkable poly(vinyl alcohol) prepolymer described in U.S. Pat. Nos. 5,583,163 and 6,303,687

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In a preferred embodiment, the inner layer is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol. The mole percentages of repeating units can be calculated based on a non-silicone hydrogel lens formulation for making the non-silicone hydrogel contact lens.

Preformed silicone hydrogel contact lenses can be any commercially-available silicone hydrogel contact lenses or can be produced according to any known methods. For example, for production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a polysiloxane vinylic crosslinker, a silicone-containing prepolymer, a hydrophilic vinylic monomer, a hydrophobic vinylic monomer, a non-silicone vinylic crosslinker, a free-radical initiator (photoinitiator or thermal initiator), a silicone-containing prepolymer, and combination thereof, as well known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

In accordance with the invention, a coating material must comprises negatively charged groups (e.g., carboxyl groups, sulfate groups, sulfonate groups, phosphate groups, etc.), optionally hydrophobic moieties and/or segments that can maintains the coating material's affinity (i.e., binding) with one or more of monomeric units of a lens material to be coated so as to form a coating on the contact lens, and optionally reactive functional groups or moieties for covalently attaching the coating material onto the surface of the contact lens.

Examples of hydrophobic moieties and/or segments include $C_8$-$C_{20}$ alkyl groups, tris(trialkylsilyloxy)silyl, di(trialkylsilyloxy)silyl, polydimethylsiloxane, polyproplene oxide, polybutylene oxide, and combinations thereof.

In a preferred embodiment, a coating material comprises first multiple reactive functional groups that can participate in a coupling reaction with the second reactive functional groups on and near the surfaces of the contact lens in the presence or absence of a coupling agent to form a crosslinked polymeric coating and optionally (but preferably) with the third reactive functional groups of a hydrophilic polymeric material. The first, second and third functional reactive groups independent of one another are preferably selected from the group consisting of azetidinium group, amino groups (i.e., primary and/or secondary amino groups), azlactone groups, isocyanate groups, epoxy groups, aziridine groups, thiol groups, hydroxyl groups, and combinations thereof, more preferably selected from the group consisting of azetidinium groups, amino groups, azlactone groups, isocyanate groups, epoxy groups, aziridine groups, thiol groups, and combinations thereof, even more preferably selected from the group consisting of azetidinium group, amino groups, epoxy groups, thiol groups, and combinations thereof, most preferably selected from the group consisting of azetidinium group, amino groups, epoxy groups, thiol groups, and combinations thereof.

It is believed that the carboxyl groups of a coating material can interact with amide-type vinylic monomeric units in the lens material through either ionic/polar interaction or hydrogen bonding to maintain an affinity to the lens material; that the carboxyl groups of a coating material can interact with ammonium-containing vinylic monomeric units in the lens material through ionic/ionic interactions and hydrogen bonding to maintain an affinity to the lens material; and that the hydrophobic moieties or segments of a polymeric coating material can interact with silicone components in the lens material through hydrophobic-hydrophobic interactions to maintain an affinity to the lens material.

Amide-containing vinylic monomers have been widely used in making contact lenses. Preferred examples of amide-type vinylic monomers includes without limitation N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, N-vinyl-2-pyrrolidone (NVP), N-vinyl formamide, N-vinyl acetamide, N-vinyl isopropylamide, N-vinyl-N-methyl acetamide, and mixtures thereof.

An "ammonium group" refers to an acidified primary, secondary or tertiary amino group. Examples of ammonium-containing vinylic monomers include without limitation allylamine, vinylamine, trimethylammonium 2-hydroxy propylmethacrylate, amino-$C_2$-$C_4$ alkyl (meth)acrylate, $C_1$-$C_4$ alkylamino-$C_2$-$C_4$ alkyl (meth)acrylate, vinylamine, amino-$C_2$-$C_4$ alkyl (meth)acrylamide, $C_1$-$C_4$ alkylamino-$C_2$-$C_4$ alkyl (meth)acrylamide, di($C_1$-$C_4$ alkyl)amino-$C_2$-$C_4$ alkyl (meth)acrylate, tri($C_1$-$C_4$ alkyl)amino-$C_2$-$C_4$ alkyl (meth)acrylate, and mixtures thereof.

Examples of carboxyl-containing vinylic monomers include without limitation acrylic acid, a $C_1$-$C_4$ alkylacrylic acid (e.g., methacrylic acid, ethylacrylic acid, propylacrylic acid, butylacrylic acid), 2-(meth)acrylamidoglycolic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, and combination thereof.

Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsiloxy)silyl)propyloxy)propyl]acrylamide; N-[2-hydroxy-3-(3-(t-butyldimethylsilyl) propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide.

Any polymer having carboxyl groups and optionally hydrophobic moieties and/or segments can be used in the invention so long as it can be dissolved in a solvent at room temperature in an amount of from about 0.001% to about 1.5%, preferably from about 0.002% to about 1%, more preferably from 0.003% to about 0.5% by weight relative to the total weight of the organic-based coating solution.

It is understood that a coating material can comprise monomeric units of one or more reactive vinylic monomers so as to have multiple reactive functional groups. Exemplary reactive vinylics includes azetidinium-containing vinylic monomers, azlactone-containing vinylic monomers, isocyanate-containing vinylic monomers, epoxy-containing vinylic monomers, and aziridinyl-containing vinylic monomers. Examples of aziridinyl-containing vinylic monomers include without limitation 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, and 8-(1-aziridinyl) octyl (meth)acrylate). Examples of epoxy-containing vinylic monomers include without limitation glycidyl (meth)acrylate, vinyl glycidyl ether, allyl glycidyl ether. Examples of isocyanate-containing vinylic monomers include without limitation 2-isocyanatoethyl (meth)acrylate, 3-isocyanatopropyl (meth)acrylate, 4-isocyanatobutyl (meth)acrylate, 6-isocyanatohexyl (meth)acrylate, 1-methyl-2-isocyanatoethyl methacrylate, and 1,1-dimethyl-2-isocyanatoethyl methacrylate. Examples of azlactone-containing vinylic monomers include without limitation 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers. Azetidinium-containing vinylic monomers can be obtained by reacting epichlorohydrin with a vinylic monomer containing primary or secondary amino groups (any those described above) according to procedures similar to what described in EP1465931 (herein incorporated by reference in its entirety).

Preferably, a polymer as a coating material is a polymer or copolymer comprising at least about 70% by mole, preferably at least about 80% by mole, more preferably at least about 90% by mole, even more preferably at least about 95% by mole of monomeric units of one or more carboxyl-containing vinylic monomers (as described above). Examples of preferred carboxyl-containing polymers as coating materials include without limitation linear or branched polyacrylic acid; linear or branched polymethacrylic acid; linear or branched poly(acrylic acid-co-acrylamide) having at least about 70% by mole, preferably at least about 80% by mole, more preferably at least about 90% by mole, even more preferably at least about 95% by mole of acrylic acid; linear or branched poly(methacrylic acid-co-acrylamide) having at least about 70% by mole, preferably at least about 80% by mole, more preferably at least about 90% by mole, even more preferably at least about 95% by mole of methacrylic acid; linear or branched poly(acrylic acid-co-vinylpyrrolidone) having at least about 70% by mole, preferably at least about 80% by mole, more preferably at least about 90% by mole, even more preferably at least about 95% by mole of acrylic acid; linear or branched poly(methacrylic acid-co-vinylpyrrolidone) having at least about 70% by mole, preferably at least about 80% by mole, more preferably at least about 90% by mole, even more preferably at least about 95% by mole of methacrylic acid.

In accordance with the invention, the weight average molecular weight $M_w$ of a polymer as a coating material is at least about 10,000 Daltons, more preferably at least about 50,000 Daltons, even more preferably from about 100,000 to 5,000,000 Daltons.

A coating of a polymer having carboxyl groups can be form on a contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polymer for forming a coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent.

It is believed that a solvent system containing at least one organic solvent can swell a silicone hydrogel contact lens so that a portion of the reactive polymer may penetrate into the silicone hydrogel contact lens and increase the durability of the coating.

Any organic solvents can be used in preparation of a solution of the polymer. Examples of organic solvents include without limitation tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, methanol, ethanol, 1- or 2-propanol, 1- or 2-butanol, tert-butanol, tert-amyl alcohol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

In accordance with the invention, a fluorescently-labeled polycationic polymer has a number average molecular weight of greater than 1500 Daltons and at least 50% by mole (preferably at least 60% by mole, more preferably at least 70% by mole, even more preferably at least 80% by mole, most preferably at least 90% by mole) of monomeric units each having a positively-charged groups (e.g., ammonium groups or protonated amino groups) at a pH from about 6.5 to about 8.0. Such a fluorescently-labeled polycationic polymer can be obtained by reacting a fluorescent compound having a reactive functional group with a preformed polycationic polymer.

Examples of preferred preformed polycationic polymers includes a mono-functional group-terminated homopolymer or copolymer mono-terminated of an amino-containing vinylic monomer, a di-functional group-terminated homopolymer or copolymer of an amino-containing vinylic monomer, a polypeptide including pendant amino groups, and combinations thereof.

Examples of amino-containing vinylic monomers include N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth) acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth) acrylate, vinylamine, allylamine, and combinations thereof.

In a preferred embodiment, a polycationic polymer is a polycationic polypeptide comprising positively-charged aminoacid units. Examples of preferred positively-charged amino acids include lysine, arginine, histine, 2,3-diaminopropionic acid, and combinations thereof. Any polypeptide comprises at least 50% by mole (preferably at least 60% by mole, more preferably at least 70% by mole, even more preferably at least 80% by mole, most preferably at least 90% by mole) of one or more positively charges aminoacid units can be used in the invention. It is believed that because such polycationic polypeptides have relatively hydrophilic polyamide backbone compared to the hydrophobic backbone of a homo- or copolymer of one or more vinylci monomers, they may not be compatible with the polymer matrix of a contact lens so that thye may not penetrate into the lens body of a contact lens, especially a silicone hydrogel contact lens.

Any fluorescent compound can be used to fluorescently label a polycationic polymer as known to a person skilled in the art. Examples of preferred fluorescent compounds include without limitation compounds including a fluorescein moiety (e.g., fluorescein isothiocyanate, FITC), compounds including rhodamine moiety (e.g., tetramethyl rhodamine isothiocyanate, TRITC), and variants thereof.

In accordance with the invention, at least one, preferably at least 3, more preferably from 3 to 12 coated contact lenses are individually immersed in an aqueous solution of a fluorescently-labeled polycationic polymer in one of the wells of a well plate. The immersion time is at least from about half hour to about 12 hours, preferably from about one hour to about 10 hours, more preferably from about one hour to about 8 hours.

The thickness of the coating on the coated contact lens can be determined according to any methods known to a person skilled in the art. For example, because an aqueous solution of a fluorescently-labeled polycationic polymer stains selectively the coating comprising negatively-charged groups over the lens body (especially lens body free of any negatively-charged groups), the stained coating on a contact lens will fluoresce, while the lens body does not fluoresce, upon irradiation with a light, when examining a cross-section of the stained coated contact lens. It is understood that the determining factors for the accuracy of thickness measurement include: whether a perfectly orthogonal cut of the stained coated contact lens can be performed; whether the vertical-standing of the cutting-lens can be maintained for microscopic measurements; and whether lens edge can be well focused under microscopy. Preferably, a confocal laser fluorescence microscopy is used to image the coating and to determine the coating thickness.

It should be understood that although various embodiments including preferred embodiments of the invention may be separately described above, they can be combined and/or used together in any desirable fashion in the method of the invention.

In another aspect, the invention provides a method for selecting a candidate coating material comprising negatively-charged groups for applying a coating onto contact lenses, comprising the steps of: (a) obtaining uncoated contact lenses each of which comprises a lens body (i.e., bulk material) which comprises a non-silicone hydrogel material or a silicone hydrogel material; (b) obtaining candidate coating materials each having negatively-charged groups; (c) applying a coating of each candidate coating material onto each uncoated contact lenses to obtain coated contact lenses under identical coating conditions; (d) selectively staining the coatings over the lens bodies of the coated contact lenses in fully hydrated state by immersing the coated contact lenses in an aqueous solution of a fluorescently-labeled polycationic polymer for a time period of about 12 hours or less (preferably 10 hours or less, more preferably 8 hours or less), wherein the aqueous solution comprises buffering agents in an amount for having a pH of from about 6.5 to about 8.0; (e) orthogonally cutting the selectively stained coated contact lenses; (f) determining the thickness of the coating on each coated contact lens for each candidate coating materials; and (g) selecting one candidate coating material that provides coated contact lenses having a desired coating thickness.

In a further aspect, the invention provides a method for producing coated contact lenses, comprising the steps of: (a) obtaining uncoated contact lenses each of which comprises a lens body (i.e., bulk material) which comprises a non-silicone hydrogel material or a silicone hydrogel material; (b) obtaining a coating material having negatively charged groups; (c) applying a coating of the coating material onto each contact lenses to obtain coated contact lenses under first coating conditions; (d) selectively staining the coatings over the lens bodies of the coated contact lenses in fully hydrated state by immersing the coated contact lenses in an aqueous solution of a fluorescently-labeled polycationic polymer for a time period of about 12 hours or less (preferably 10 hours or less, more preferably 8 hours or less), wherein the aqueous solution comprises buffering agents in an amount for having a pH of from about 6.5 to about 8.0; (e) orthogonally cutting the selectively stained coated contact lenses; (f) determining the thickness of the coating on each coated contact lens; and (g) if the thickness determined in step (f) of the coating on each coated contact lenses is thinner than a predetermined thickness criteria, repeating optimization cycles each consisting of steps (b) to (f) until the thickness of the coating on each coated contact lenses meet the criteria, provided that coating conditions in step (b) is changed in each optimization repeating cycle.

In accordance with the invention, an "uncoated contact lens" means a preformed contact lens that has not been subjected to any surface modification posterior to the lens-forming process well known to a person skilled in the art. All of the various embodiments including preferred embodiments described above for the previous aspect of the invention can used in these two aspects of the invention.

Coating conditions, which can affect the thickness of the coating on resultant coated contact lenses, include without limitation the concentration of a polymer as a coating material, the composition of a polymer as a coating material, the molecular weight of a polymer as a coating material, the solvent used in preparing a coating solution of a polymer as a coating material, and the contacting time of a silicone hydrogel contact lens with a coating solution. The thickness criteria (i.e., lowest thickness) of a coating is one value selected from about 0.05 to about 20 micrometers, preferably from about 0.1 to about 15 micrometers, more preferably from about 0.2 to about 10 micrometers, even more preferably from about 0.5 to about 10 micrometers.

The thickness of the coating on resultant coated contact lenses both increase as the concentration of a polymer as a coating material in a coating solution increases, if other coating conditions are kept constant.

The thickness of the coating on resultant coated contact lenses both increase as the molecular weight of a polymer as a coating material in a coating solution increases, if other coating conditions are kept constant.

The thickness of the coating on resultant coated contact lenses both increase as the solvent used in preparing a coating solution of a polymer as a coating material contains less amount of water, if other coating conditions are kept constant.

The thickness of the coating on resultant coated contact lenses both increase as the contacting time of a contact lens with a coating solution increases, if other coating conditions are kept constant.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for determining the thickness of coatings on the surfaces of contact lenses, comprising the steps of:
   (a) obtaining a coated contact lens in fully hydrated state, wherein the coated contact lens comprises a lens body (i.e., bulk material) and a coating thereon, wherein the lens body comprises a non-silicone hydrogel material or a silicone hydrogel material, wherein the coating comprises a coating material having negatively-charged groups;
   (b) selectively staining the coating over the lens body of the coated contact lens by immersing the coated contact lens in an aqueous solution of a fluorescently-labeled polycationic polymer for a time period of about 12 hours or less, wherein the aqueous solution comprises buffering agents in an amount for having a pH of from about 6.5 to about 8.0;
   (c) orthogonally cutting the selectively-stained coated contact lens; and
   (d) determining the thickness of the coating on the coated contact lens.
2. The method of embodiment 1, wherein the non-silicone hydrogel material or the silicone hydrogel material is free of negatively-charged groups.
3. The method of embodiment 1 or 2, wherein the lens body comprises a silicone hydrogel material.
4. The method of any one of embodiments 1 to 3, wherein the negatively charged groups of the coating material are carboxyl groups.
5. The method of any one of embodiments 1 to 4, wherein the fluorescently-labeled polycationic polymer has a number average molecular weight of greater than 1500 Daltons and at least 50% by mole of monomeric units each having a positively-charged groups at a pH from about 6.5 to about 8.0.
6. The method of any one of embodiments 1 to 5, wherein the fluorescently-labeled polycationic polymer is a fluorescently-labeled polycationic polypeptide which comprises at least 50% by mole of one or more positively charges amino acid units selected from the group consisting of lysine, arginine, histine, 2,3-diaminopropionic acid, and combinations thereof.

7. A method for selecting a candidate coating material comprising negatively-charged groups for applying a coating onto contact lenses, comprising the steps of:
   (a) obtaining uncoated contact lenses each of which comprises a lens body which comprises a non-silicone hydrogel material or a silicone hydrogel material;
   (b) obtaining candidate coating materials each having negatively-charged groups;
   (c) applying a coating of each candidate coating material onto each uncoated contact lenses to obtain coated contact lenses under identical coating conditions;
   (d) selectively staining the coatings over the lens bodies of the coated contact lenses in fully hydrated state by immersing the coated contact lenses in an aqueous solution of a fluorescently-labeled polycationic polymer for a time period of about 12 hours or less, wherein the aqueous solution comprises buffering agents in an amount for having a pH of from about 6.5 to about 8.0;
   (e) orthogonally cutting the selectively stained coated contact lenses;
   (f) determining the thickness of the coating on each coated contact lens for each candidate coating materials; and
   (g) selecting one candidate coating material that provides coated contact lenses having a desired coating thickness.

8. A method for producing coated contact lenses, comprising the steps of:
   (a) obtaining uncoated contact lenses each of which comprises a lens body which comprises a non-silicone hydrogel material or a silicone hydrogel material;
   (b) obtaining a coating material having negatively charged groups;
   (c) applying a coating of the coating material onto each contact lenses to obtain coated contact lenses under first coating conditions;
   (d) selectively staining the coatings over the lens bodies of the coated contact lenses in fully hydrated state by immersing the coated contact lenses in an aqueous solution of a fluorescently-labeled polycationic polymer for a time period of about 12 hours or less, wherein the aqueous solution comprises buffering agents in an amount for having a pH of from about 6.5 to about 8.0;
   (e) orthogonally cutting the selectively stained coated contact lenses;
   (f) determining the thickness of the coating on each coated contact lens; and
   (g) if the thickness determined in step (f) of the coating on each coated contact lenses is thinner than a predetermined thickness criteria, repeating optimization cycles each consisting of steps (b) to (f) until the thickness of the coating on each coated contact lenses meet the criteria, provided that coating conditions in step (b) is changed in each optimization repeating cycle.

9. The method of embodiment 7 or 8, wherein the non-silicone hydrogel material or the silicone hydrogel material is free of negatively-charged groups.

10. The method of any one of embodiments 7 to 9, wherein the lens body comprises a silicone hydrogel material.

11. The method of embodiment 10, wherein the negatively charged groups of the coating material are carboxyl groups.

12. The method of any one of embodiments 7 to 11, wherein the fluorescently-labeled polycationic polymer has a number average molecular weight of greater than 1500 Daltons and at least 50% by mole of monomeric units each having a positively-charged groups at a pH from about 6.5 to about 8.0.

13. The method of any one of embodiments 7 to 12, wherein the fluorescently-labeled polycationic polymer is a fluorescently-labeled polycationic polypeptide which comprises at least 50% by mole of one or more positively charges amino acid units selected from the group consisting of lysine, arginine, histine, 2,3-diaminopropionic acid, and combinations thereof.

14. The method of embodiment 8, wherein the thickness criteria (i.e., lowest thickness) of a coating is one value of from about 0.05 to about 20 micrometers.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

A fluorescently-labeled polycationic polypeptide, Rhodamine-NH-(A[DAP]11-KCOOMe, is prepared by using a solid phase peptide synthesis approach. DAP stands for 2,3-diaminopropionic acid; Me stands for methyl.

The prepared fluorescently-labeled polycationic polymer is dissolved in dimethyl sulfoxide (DMSO) at a concentration of 2 mg/mL as a staining stock solution. A phosphate buffered solution is prepared by adding 10 μL of the staining stock solution into 700 μL of phosphate buffered saline (which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent) in each wells of a 24 well plate. Mixing is carried out directly in the wells. One contact lens is placed in each well containing the phosphate-buffered solution of the fluorescently-labeled polycationic polymer and incubated on a horizontal shake overnight.

The cross-section of a stained contact lens is orthogonally cut using two parallel blades. The cross-sections of the stained lens are then imaged and analyzed using Nikon confocal fluorescence microscopy.

There are at least three challenges to measure the thickness of carboxyl containing coated layer. The first is to make a perfectly orthogonal cut of the lens; the second is to control the vertical-standing of the cutting-lens; and the third is to get lens edge well focused. Otherwise, measurement data will be the glitch of the "overhang" of the bevel.

Example 2

Coated silicone hydrogel contact lenses are prepared according to the procedures described in Example 17 of U.S. patent Ser. No. 10/449,740. Each of the coated silicone hydrogel contact lenses has a poly(acrylic acid) (PAA) base coating on a silicone hydrogel contact lens and a hydrogel coating on top of the PAA base coating.

These coated silicone hydrogel contact lenses are subjected to the selective staining procedures described in Example 1. Cross-sections of the stained coated silicone hydrogel contact lenses are orthogonally cut and then imaged as described in Example 1. FIG. 1 shows an image in submicron resolution of the cross-section of a stained coated silicone hydrogel contact lens.

Example 3

Coated silicone hydrogel contact lenses are prepared according to the procedures described in Example 19 of U.S. Pat. No. 8,480,227. Each of the coated silicone hydrogel contact lenses has a poly(acrylic acid) (PAA) base coating on a silicone hydrogel contact lens and a hydrogel coating on top of the PAA base coating.

Figure 4:
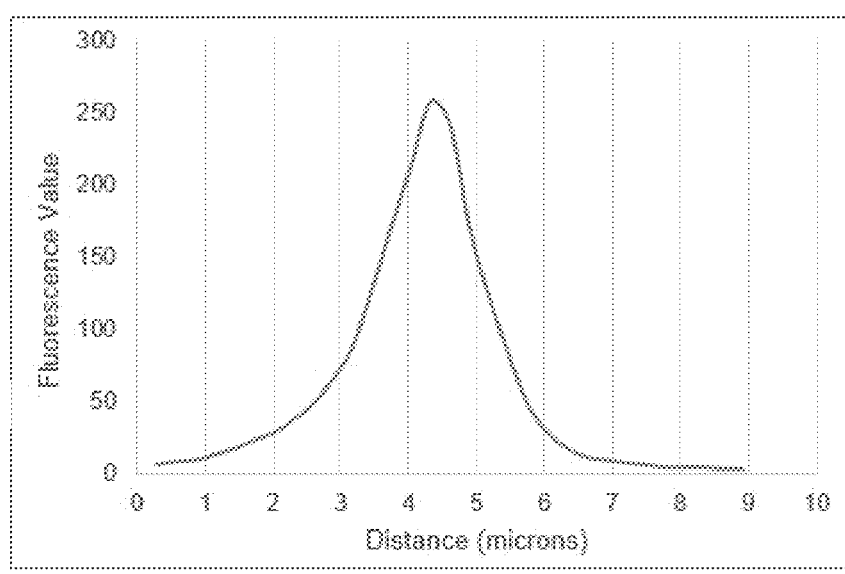
FIG. 4 shows the results of a line scan in image analysis as indicated in FIG. 3 as a plot of fluorescence value vs distance.

These coated silicone hydrogel contact lenses are subjected to the selective staining procedures described in Example 1. Cross-sections of the stained coated silicone hydrogel contact lenses are orthogonally cut and then imaged as described in Example 1. FIGS. 2 and 3 show an image in submicron resolution of the cross-section of a stained coated silicone hydrogel contact lens. Aline scan in image analysis is used to measure the thickness of the coating at a location as indicated in FIG. 2b and the results is shown in FIG. 4. This plot of fluorescence value vs. the distance shows that the coating thickness is about 3-5 microns.

All the publications and patents which have been cited herein above are hereby incorporated by reference in their entireties.

What is claimed is:

1. A method for determining the thickness of coatings on the surfaces of contact lenses, comprising the steps of:
   (a) obtaining a coated contact lens in fully hydrated state, wherein the coated contact lens comprises a lens body and a coating thereon, wherein the lens body comprises a non-silicone hydrogel material or a silicone hydrogel material, wherein the coating comprises a coating material having negatively-charged groups;
   (b) selectively staining the coating over the lens body of the coated contact lens by immersing the coated contact lens in an aqueous solution of a fluorescently-labeled polycationic polymer for a time period of about 12 hours or less, wherein the aqueous solution comprises buffering agents in an amount for having a pH of from about 6.5 to about 8.0;
   (c) orthogonally cutting the selectively-stained coated contact lens; and
   (d) determining the thickness of the coating on the coated contact lens.

2. The method of claim 1, wherein the non-silicone hydrogel material or the silicone hydrogel material is free of negatively-charged groups.

3. The method of claim 2, wherein the lens body comprises a silicone hydrogel material.

4. The method of claim 3, wherein the negatively charged groups of the coating material are carboxyl groups.

5. The method of claim 4, wherein the fluorescently-labeled polycationic polymer has a number average molecular weight of greater than 1500 Daltons and at least 50% by mole of monomeric units each having a positively-charged groups at a pH from about 6.5 to about 8.0.

6. The method of claim 5, wherein the fluorescently-labeled polycationic polymer is a fluorescently-labeled polycationic polypeptide which comprises at least 50% by mole of one or more positively charges amino acid units selected from the group consisting of lysine, arginine, histine, 2,3-diaminopropionic acid, and combinations thereof.

* * * * *